US012637536B2

(12) United States Patent
Misumi et al.

(10) Patent No.: US 12,637,536 B2
(45) Date of Patent: May 26, 2026

(54) EPOXY RESIN COMPOSITION, PREPREG, FIBER-REINFORCED RESIN MOLDED BODY, AND INTEGRATED PRODUCT

(71) Applicant: Toray Industries, Inc., Tokyo (JP)

(72) Inventors: Jun Misumi, Iyo-gun (JP); Masato Honma, Iyo-gun (JP); Kyoko Shinohara, Iyo-gun (JP)

(73) Assignee: Toray Industries, Inc., Tokyo (JP)

( * ) Notice: Subject to any disclaimer, the term of this patent is extended or adjusted under 35 U.S.C. 154(b) by 485 days.

(21) Appl. No.: 18/035,400

(22) PCT Filed: Oct. 27, 2021

(86) PCT No.: PCT/JP2021/039656

§ 371 (c)(1),
(2) Date: May 4, 2023

(87) PCT Pub. No.: WO2022/107564

PCT Pub. Date: May 27, 2022

(65) Prior Publication Data

US 2023/0406997 A1 Dec. 21, 2023

(30) Foreign Application Priority Data

Nov. 18, 2020 (JP) ................................ 2020-191463

(51) Int. Cl.

*C08G 59/24* (2006.01)
*C08G 59/50* (2006.01)
*C08J 5/04* (2006.01)
*C08J 5/24* (2006.01)
*C08L 81/04* (2006.01)

(52) U.S. Cl.

CPC ....... *C08G 59/245* (2013.01); *C08G 59/5033* (2013.01); *C08J 5/042* (2013.01); *C08J 5/243* (2021.05); *C08L 81/04* (2013.01); *C08L 2201/08* (2013.01)

(58) Field of Classification Search

CPC .. C08G 59/24; C08G 59/50; C08J 5/24; C08J 5/04; C08J 81/04; C08L 81/04

USPC .......................................................... 523/468

See application file for complete search history.

(56) References Cited

U.S. PATENT DOCUMENTS

| | | | | |
|---|---|---|---|---|
| 8,415,007 | B2 | 4/2013 | Honma et al. | |
| 2018/0244880 | A1* | 8/2018 | Aoki ........................ | C08J 5/243 |
| 2019/0276661 | A1 | 9/2019 | Shim et al. | |
| 2020/0332056 | A1 | 10/2020 | Shim et al. | |
| 2022/0324184 | A1 | 10/2022 | Misumi et al. | |

FOREIGN PATENT DOCUMENTS

| | | | |
|---|---|---|---|
| JP | 2002155128 | A | 5/2002 |
| JP | 2004035702 | A | 2/2004 |
| JP | 20072111143 | A | 8/2007 |
| JP | 2008094961 | A | 4/2008 |
| JP | 2014218600 | A | 11/2014 |
| JP | 2015159177 | A | 9/2015 |
| JP | 2018145410 | A | 9/2018 |
| JP | 2019526657 | A | 9/2019 |
| JP | 2020145328 | A | 9/2020 |
| WO | 2004060658 | A1 | 7/2004 |
| WO | 2020235484 | A1 | 11/2020 |

OTHER PUBLICATIONS

International Search Report and Written Opinion for International Application No. PCT/JP2021/039656, dated Jan. 11, 2022, 8 pages.

* cited by examiner

*Primary Examiner* — Deve V Hall

(74) *Attorney, Agent, or Firm* — Buchanan Ingersoll & Rooney PC

(57) ABSTRACT

An epoxy resin composition is provided that is resistant to decomposition at high temperatures and a fiber-reinforced resin molding is provided that hardly suffers significant damage while being welded to another member even in the case where it is combined with a thermoplastic resin layer having a high melting point that works as an adhesive layer, as well as a prepreg that serves as a precursor therefor, where the epoxy resin composition includes an epoxy resin (A) that has a polycyclic aromatic hydrocarbon skeleton or a biphenyl skeleton and that has an epoxy equivalent weight of 220 g/eq or more and 290 g/eq or less and a polyamine compound having an average active hydrogen equivalent weight of 55 g/eq or more and 100 g/eq or less wherein the average epoxy equivalent weight over all epoxy resins contained is 160 g/eq or more and 255 g/eq or less.

14 Claims, 1 Drawing Sheet

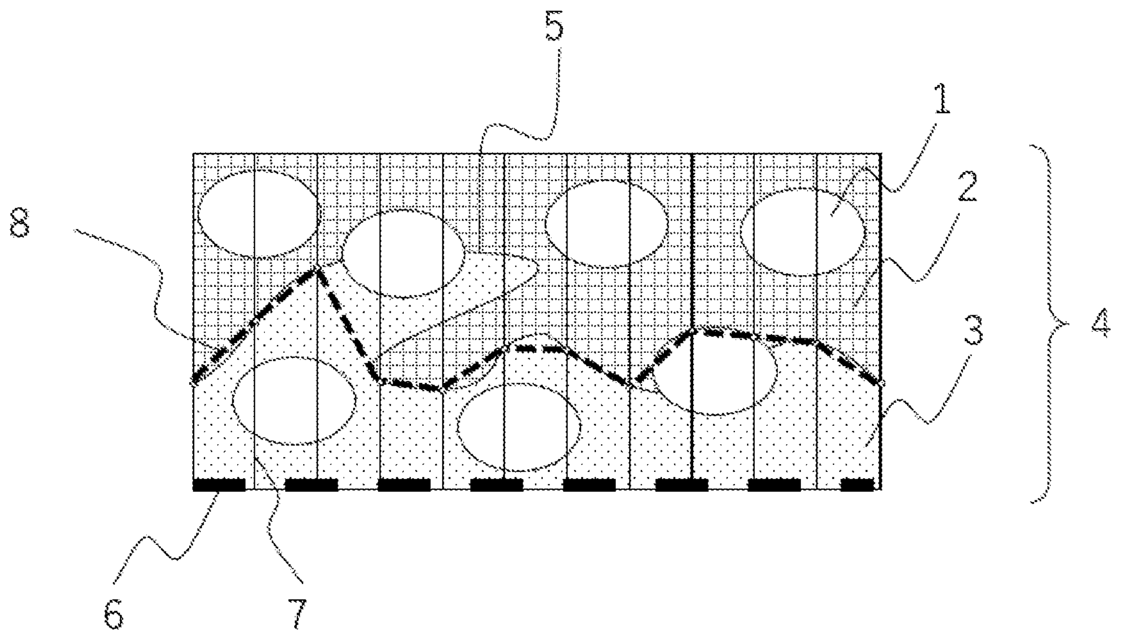
5
1
8
2
3
4
6
7

EPOXY RESIN COMPOSITION, PREPREG, FIBER-REINFORCED RESIN MOLDED BODY, AND INTEGRATED PRODUCT

CROSS REFERENCE TO RELATED APPLICATIONS

This application is the U.S. National Phase application of PCT/JP2021/039656, filed Oct. 27, 2021 which claims priority to Japanese Patent Application No. 2020-191463, filed Nov. 18, 2020, the disclosures of these applications being incorporated herein by reference in their entireties for all purposes.

FIELD OF THE INVENTION

The present invention relates to an epoxy resin composition. Other aspects of the present invention relate to a prepreg and a fiber-reinforced resin molding produced from the epoxy resin composition.

BACKGROUND OF THE INVENTION

High in heat resistance and corrosion resistance as well as mechanical properties such as strength and stiffness, in spite of being light in weight, fiber-reinforced resins produced by combining a thermosetting resin such as epoxy resin used as matrix with a reinforcing fiber such as carbon fiber and glass fiber have been used conventionally in a wide variety of fields including aviation/aerospace, automobiles, railway vehicles, ships, civil engineering/construction, sports goods, and electronic components. However, fiber-reinforced resins that include thermosetting resins are not suitable for molding products in complicated shapes, and when producing components and structures having complicated shapes, therefore, it is necessary to first prepare fiber-reinforced resin members in relatively simple shapes and then integrating them with other members made of materials that are the same as or different from the fiber-reinforced resins (hereinafter simply referred to as other members or another member).

Useful methods for integrating fiber-reinforced resins with other members include mechanical joining techniques such as the use of bolts, rivets, screws, etc., and other joining techniques such as the use of adhesives etc. However, mechanical joining techniques require a step for pre-processing of the joining portions such as drilling, which can lead to the problem of prolonged manufacturing processes and increased manufacturing cost and the problem of a decrease in material strength due to such processing. Joining techniques that use adhesives require many steps such as the preparation of an adhesive, bonding operations including application of the adhesive, and curing, which can lead to the problem of prolonged manufacturing processes and the problem of difficulty in ensuring sufficient reliability in terms of adhesive strength.

As a solution to these problems, development efforts made in recent years have provided fiber-reinforced resins in which a thermoplastic resin layer is disposed at the surface of a fiber-reinforced resin prepared from a thermosetting resin (Patent document 1). These fiber-reinforced resins can be joined easily to other members by welding via the thermoplastic resin layer.

PATENT DOCUMENTS

Patent document 1: International Publication WO 2004/060658

SUMMARY OF THE INVENTION

In applications where heat resistance is required, in particular, when a resin with a high melting point such as super engineering plastics is used as material for the thermoplastic resin layer of a fiber-reinforced resin that has such a thermoplastic resin layer thereon, welding it to another member requires a high temperature of 300° C. or more, and in this step, the surrounding epoxy resin is also exposed to the high temperature of 300° C. or higher. Epoxy resins tend to start decomposing rapidly at about 300° C., and therefore, if welding is performed at about 300° C., it is feared that damage may occur due to the decomposition of the epoxy resins.

The main object of the present invention is to provide an epoxy resin composition that is resistant to heat and is not decomposed significantly even in such cases. It also aims to provide a fiber-reinforced resin molding that hardly suffers significant damage while being welded to another member even in the case where it is combined with a thermoplastic resin layer having a high melting point that works as an adhesive layer, and also provide a prepreg that serves as a precursor thereof.

To solve these problems, the epoxy resin composition according to the present invention includes an epoxy resin (A) that has a polycyclic aromatic hydrocarbon skeleton or a biphenyl skeleton and has an epoxy equivalent weight of 220 g/eq or more and 290 g/eq or less and a polyamine compound having an average active hydrogen equivalent weight of 55 g/eq or more and 100 g/eq or less wherein the average epoxy equivalent weight over all epoxy resins contained is 160 g/eq or more and 255 g/eq or less.

The use of the epoxy resin composition according to the present invention as matrix resin enables the production of a fiber-reinforced resin molding having high heat resistance. In particular, even when combined with a thermoplastic resin layer having a high melting point that is used as adhesive layer, it hardly suffers significant damage while being welded to another member.

BRIEF DESCRIPTION OF THE DRAWINGS

This FIGURE gives a schematic diagram of a cross-section perpendicular to the plane of a prepreg or a fiber-reinforced resin prepared by using the epoxy resin composition according to the present invention and assists the description of the undermentioned measuring methods for the roughness average length RSm and the roughness average height Rc.

DETAILED DESCRIPTION OF EMBODIMENTS OF THE INVENTION

In the present DESCRIPTION, when a range is defined by two FIGURES with a "–" or "to" in between, the range is inclusive of the FIGURES.

<Epoxy Resin Composition>

The epoxy resin composition according to the present invention includes an epoxy resin (A) having a polycyclic aromatic hydrocarbon skeleton or a biphenyl skeleton and having an epoxy equivalent weight of 220 g/eq or more and 290 g/eq or less. It is preferable for the epoxy resin (A) to have an epoxy equivalent weight of 235 g/eq or more and 270 g/eq or less. It should be noted that the epoxy equivalent weight used in the present DESCRIPTION is determined according to the method specified in JIS K7236 (2009).

Such an epoxy resin having a polycyclic aromatic hydrocarbon skeleton may be, for example, an epoxy resin having a naphtalene skeleton, an epoxy resin having an anthracene skeleton, an epoxy resin having a phenanthrene skeleton, an epoxy resin having a pyrene skeleton, or an epoxy resin having a tetracene skeleton. Examples thereof include naphthylene ether type epoxy resin, naphthalenediol type epoxy resin, methylene dinaphthol type epoxy resin, dinaphthol type epoxy resin, naphthol phenyl aralkyl type epoxy resin, naphthol biphenyl aralkyl type epoxy resin, and anthracene diol type epoxy resin.

Examples of such an epoxy resin having a biphenyl skeleton include biphenol diglycidyl ether and phenol biphenyl aralkyl type epoxy resin.

The epoxy resin having a polycyclic aromatic hydrocarbon skeleton is more preferably an epoxy resin having a structure as represented by the formula (1) or formula (2) in order to develop higher resistance to thermal degradation at high temperatures and favorable glass transition temperature.

[Chemical compound 1]

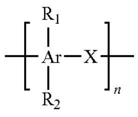

(1)

(In the formula (1), X is selected from an ether bond, a sulfide bond, and a biphenyl bond, and $R_1$ and $R_2$ are each independently selected from a hydrogen atom, an aliphatic hydrocarbon group with a carbon number of 1 to 4, an alicyclic hydrocarbon group with a carbon number of 4 or less, a halogen atom, a glycidyl ether group, and a glycidyl amine group. Ar is selected from naphthalene, anthracene, phenanthrene, pyrene, and tetracene, and n is an integer of 2 or more.)

[Chemical compound 2]

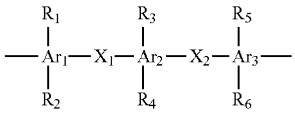

(2)

(In the formula (2), $X_1$ and $X_2$ are each independently selected from an ether bond, a sulfide bond, and a biphenyl bond, and $R_1$ to $R_6$ are each independently selected from a hydrogen atom, an aliphatic hydrocarbon group with a carbon number of 1 to 4, an alicyclic hydrocarbon group with a carbon number of 4 or less, a halogen atom, a glycidyl ether group, and a glycidyl amine group. $Ar_1$ to $Ar_3$ are each independently selected from phenylene, naphthylene, anthracene, phenanthrene, pyrene, and tetracene, and at least one or more of $Ar_1$ to $Ar_3$ are selected from the above group excluding phenylene.) Commercial products of epoxy resins having structures as represented by the formula (1) or the formula (2) include EPICLON® HP-6000 (manufactured by DIC Corporation).

In order to ensure higher resistance to thermal degradation at high temperatures and a favorable glass transition temperature, it is preferable for the epoxy resin (A) to have a weight average molecular weight of 500 g/mol or more and 1,000 g/mol or less.

In the epoxy resin composition according to the present invention, the epoxy resin (A) preferably accounts for a mass content of 35 parts by mass or more and 100 parts by mass or less relative to the total epoxy resin quantity, which accounts for 100 parts by mass, in order to ensure higher resistance to thermal degradation. The mass content of the epoxy resin (A) is more preferably 45 parts by mass or more and 100 parts by mass or less.

In the case where an epoxy resin other than the epoxy resin (A) is contained, examples of such an epoxy resin include bisphenol type epoxy resins such as bisphenol A type epoxy resin, bisphenol F type epoxy resin, bisphenol AD type epoxy resin, and bisphenol S type epoxy resin; brominated epoxy resins such as tetrabromobisphenol A diglycidyl ether; novolac type epoxy resins such as epoxy resin having a dicyclopentadiene skeleton, phenol novolac type epoxy resin, and cresol novolac type epoxy resin; glycidyl amine type epoxy resins such as N,N,O-triglycidyl-m-aminophenol, N,N,O-triglycidyl-p-aminophenol, N,N,O-triglycidyl-4-amino-3-methyl phenol, N,N,N',N'-tetraglycidyl-4,4'-m ethylene dianiline, N, N, N',N'-tetraglycidyl-2,2'-diethyl-4,4'-methylene dianiline, N,N,N',N'-tetraglycidyl-m-xylylene diamine, N, N-diglycidyl aniline, and N,N-diglycidyl-o-toluidine; and others such as resorcin diglycidyl ether and triglycidyl isocyanurate.

Furthermore, in the epoxy resin composition according to the present invention, the average epoxy equivalent weight (hereinafter simply referred to as the average epoxy equivalent weight) over all epoxy resins contained in the composition, including the epoxy resin (A), is 160 g/eq or more and 255 g/eq or less. If the average epoxy equivalent weight is less than 160 g/eq, it will fail in producing a cured product having a sufficient resistance to thermal degradation. If the average epoxy equivalent weight is more than 255 g/eq, the resulting cured product will be low in glass transition temperature and poor in mechanical property in a high wet heat environment. The average epoxy equivalent weight is more preferably 180 g/eq or more and 255 g/eq or less. Here, for example, in the case where two components, namely, epoxy resin 1 and epoxy resin 2, are contained, the average epoxy equivalent weight is calculated as described below. Average epoxy equivalent weight (g/eq)=(parts by mass of epoxy resin 1×epoxy equivalent weight of epoxy resin 1+parts by mass of epoxy resin 2×epoxy equivalent weight of epoxy resin 2)/(parts by mass of epoxy resin 1+parts by mass of epoxy resin 2) Calculation can be performed in the same way in the case where three or more epoxy resin components are contained, and calculation is performed as described below in the case where N epoxy resin components, namely, epoxy resin 1 to epoxy resin N, are contained. Average epoxy equivalent weight (g/eq)=(parts by mass of epoxy resin 1×epoxy equivalent weight of epoxy resin 1+parts by mass of epoxy resin 2×epoxy equivalent weight of epoxy resin 2+ . . . +parts by mass of epoxy resin N×epoxy equivalent weight of epoxy resin N)/(parts by mass of epoxy resin 1+parts by mass of epoxy resin 2+ . . . +parts by mass of epoxy resin N)

The epoxy resin composition according to the present invention includes a polyamine compound having an average active hydrogen equivalent weight of 55 g/eq or more and 100 g/eq or less. The term "polyamine compound" as used in the present DESCRIPTION is a genetic name of a compound having two or more amino groups and examples thereof include dicyandiamide, aliphatic amine compounds, aromatic amine compounds, tetramethylguanidine, thiourea added amine, and carboxylic acid hydrazide. The fact that the polyamine compounds have an average active hydrogen equivalent weight of 55 g/eq or more and 100 g/eq or less serves to ensure a higher resistance to thermal degradation at high temperatures. The active hydrogen equivalent weight of a polyamine compound as referred to in the present DESCRIPTION is an active hydrogen equivalent weight value calculated from its chemical structure and its proportion identified by liquid chromatography-mass spectrometry (LC/MS). Here, for example, in the case where two components, namely, polyamine compound 1 and polyamine compound 2, are contained, the average active hydrogen equivalent weight is calculated as described below. Average active hydrogen equivalent weight (g/eq)=(parts by mass of polyamine compound 1×active hydrogen equivalent weight of polyamine compound 1+parts by mass of polyamine compound 2×active hydrogen equivalent weight of polyamine compound 2)/(parts by mass of polyamine compound 1+parts by mass of polyamine compound 2) In the case where three or more polyamine compounds are contained, calculation can be performed in the same way as for epoxy resin described above.

In particular, it is preferable that an aromatic amine compound having two or more amino groups be used as the polyamine compound because it has a high reactivity and serves to produce a cured product having good mechanical properties and heat resistance. Examples of such an aromatic amine compound having two or more amino groups include diaminodiphenyl sulfone, diaminobenzanilide, diaminobenzophenone, and diaminodiphenylmethane, as well as isomers thereof, aliphatic hydrocarbon adducts thereof, and halogen group adducts thereof.

The epoxy resin composition according to the present invention may further include curing accelerator in addition to the polyamine compound. Examples of such a curing accelerator include cationic polymerization initiators, tertiary amines, imidazole compounds, and urea compounds.

It is also preferable for the epoxy resin composition according to the present invention to include, as a viscosity modifier, a thermoplastic resin component that is soluble in the epoxy resin. The expression "being soluble in the epoxy resin" as used herein means that there exists a temperature region where a homogeneous phase is formed when the thermoplastic resin component is mixed with the epoxy resin contained in the epoxy resin composition according to the present invention and then heated while stirring. Here, the expression "a homogeneous phase is formed" means that there occurs a state in which phase separation is not found by visual observation. As long as the relevant thermoplastic resin can form a homogeneous phase with the epoxy resin in a temperature region, phase separation may occur outside the temperature region, for example, at room temperature. Thus, the thermoplastic resin soluble in the epoxy resin preferably accounts for 3 mass % or more and 25 mass % or less of the epoxy resin composition according to the present invention.

In general, such a thermoplastic resin component soluble in the epoxy resin is preferably a thermoplastic resin in which the principal chain contains a bond selected from the group consisting of carbon-carbon bond, amide bond, imide bond, ester bond, ether bond, carbonate bond, urethane bond, thioether bond, sulfone bond, and carbonyl bond. Furthermore, this thermoplastic resin component may partly contain crosslinked structures and may be either crystalline or noncrystalline. It is preferably at least one resin selected from the group consisting of polyamide, polycarbonate, polyacetal, polyphenyleneoxide, polyphenylenesulfide, polyallylate, polyester, polyamideimide, polyimide, polyetherimide, polyimide having a phenyltrimethylindane structure, polysulfone, polyethersulfone, polyetherketone, polyetheretherketone, polyaramid, polyvinyl formal, polyvinyl butyral, phenoxy resin, polyethernitrile, and polybenzimidazole.

A cured product produced by heating the epoxy resin composition according to the present invention at 180° C. for 120 minutes preferably shows a rate of mass loss on heating of 1.0% or less when maintained at 300° C. for 2 minutes. In addition, it is also preferable for the cured product to have a glass transition temperature of 180° C. or more and 350° C. or less. If the cured product has such characteristics, the fiber-reinforced resin molding produced therefrom by combining a thermoplastic resin layer having a high melting point that works as an adhesive layer as described later will not suffer significant damage while being welded to an adherend. The rate of mass loss on heating at 300° C. for 2 minutes is more preferably 0.7% or less, and still more preferably 0.5% or less. The rate of mass loss on heating can be determined according to JIS K7120 (1987). Furthermore, the glass transition temperature can be determined according to JIS K7244-7 (2007).

<Prepreg>

Another aspect of the present invention relates to a prepreg that includes the aforementioned epoxy resin composition and a reinforcing fiber impregnated therewith (hereinafter occasionally referred to as the prepreg according to the present invention).

Examples of the reinforcing fiber include glass fiber, carbon fiber, metal fiber, aromatic polyamide fiber, polyaramid fiber, alumina fiber, silicon carbide fiber, boron fiber, and basalt fiber. These may be used singly or as a combination of two or more thereof.

As the reinforcing fiber, a carbon fiber that is low in specific gravity and high in strength and elastic modulus is used suitably. Commercial products of carbon fiber include Torayca® T800G-24K, Torayca® T800S-24K, Torayca® T700G-24K, Torayca® T700S-24K, Torayca® T300-3K, Torayca® T1100G-24K, Torayca® M30S-18K, Torayca® M40J-12K, and Torayca® M60J-6K (all manufactured by Toray Industries, Inc.).

In particular, the reinforcing fiber preferably has a strand tensile strength of 5.5 GPa or more as measured according to the resin-impregnated strand test method specified in JIS R7608 (2007) because it serves to produce a fiber-reinforced resin having a high joining strength in addition to a high tensile strength. Its strand tensile strength is more preferably 5.8 GPa or more. The joining strength referred to above is the strength of a joining that develops when the fiber-reinforced resin molding having a thermoplastic resin region at the surface, which will be described later, is welded to another member and is determined according to ISO4587: 1995 (JIS K6850 (1994)).

These reinforcing fibers may have treated surfaces. Useful surface treatment methods include metal cladding treatment, treatment with a coupling agent, treatment with a sizing agent, and attachment of an additive.

Furthermore, it is preferable to use a reinforcing fiber having a surface free energy of 10 $mJ/m^2$ or more and 50 $mJ/m^2$ or less as measured by the Wilhelmy method. If it is controlled in this range, the aforementioned reinforcing fibers will exhibit high affinity with the aforementioned epoxy resins and thermoplastic resins and develop a high tensile shear joining strength when the fiber-reinforced resin molding having a thermoplastic resin region at the surface, which will be described later, is welded to another member. In addition, it also serves to suppress the agglomeration of reinforcing fibers, ensure enhanced dispersion of reinforcing fibers in the molded article, and reduce the variation (coefficient of variation) in tensile shear joining strength. It is preferable for the reinforcing fiber to have a surface free energy of 15 mJ/$m^2$ or more and 40 mJ/$m^2$ or less, more preferably 18 mJ/$m^2$ or more and 35 mJ/$m^2$ or less. A good method for controlling the surface free energy of such a reinforcing fiber is oxidizing its surface to adjust the quantity of oxygen-containing functional groups such as carboxyl group and hydroxyl group and another good control method is attaching a compound or a plurality of compounds to the surface. When a plurality of compounds are to be attached to the surface, it may be effective to use a mixture of a compound with a small surface free energy and one with a large surface free energy. The surface free energy can be determined by measuring the contact angles between the reinforcing fiber and three different solvents (purified water, ethylene glycol, and tricresyl phosphate) and calculating the surface free energy using the Owens approximation formula. The procedure is outlined below, but details relating to measurement and equipment are not particularly limited thereto.

First, using DCAT11, manufactured by DataPhysics, a monofilament is taken out from a reinforcing fiber bundle, cut into eight pieces with lengths of 12±2 mm, and pasted in parallel to each other with spacings of 2 to 3 mm between the monofilament pieces on a dedicated holder (FH12, flat plate having a surface coated with a sticking substance). Then, the ends of the monofilaments are cut and flushed, and they were set on DCAT11. In a measuring run, a cell containing one of the solvents is brought closer to the bottom end of the bundle of eight monofilaments at a speed of 0.2 mm/s to immerse the monofilaments to a position 5 mm from the ends. Then, the monofilaments are pulled up at a speed of 0.2 mm/s. This procedure is repeated four times. The force F that the monofilaments receive while in the liquid is measured using an electronic balance. Using these measurements, the contact angle θ is calculated by the equation given below.

COSθ=(force F (mN) received by 8 monofilaments)/((8 (number of monofilaments)×circumference (m) of monofilaments×surface tension of solvent (mJ/$m^2$)) Here, measurements are taken from monofilaments sampled from three different portions of a reinforcing fiber bundle. This means that a total of 24 monofilaments are sampled from one reinforcing fiber bundle and the measured contact angle values are averaged over them.

The surface free energy $y_f$ of a reinforcing fiber is calculated as the sum of the polar component $y^p_f$ of the surface free energy and the non-polar component $y^d_f$ of the surface free energy.

The polar component $y^p_f$ of the surface free energy is determined by substituting the components and contact angle of the solvent into the following Owens approximation formula (including polar component and non-polar component of surface tension, and contact angle θ, which are characteristic of a solvent), plotting it on an X-Y plane, and calculating the square of the slope a of a straight line drawn by the least square method. The non-polar component $y^d_f$ of the surface free energy is calculated from the square of the intercept b. The surface free energy $y_f$ of the reinforcing fiber is the sum of the square of the slope a and the square of the intercept b.

$$Y=a \cdot X+b$$

X=√(polar component (mJ/$m^2$) of surface tension of solvent)/√(non-polar component (mJ/$m^2$) of surface tension of solvent)

Y=(1+COSθ)·(polar component (mJ/$m^2$) of surface tension of solvent/2√(non-polar component (mJ/$m^2$) of surface tension of solvent)

Polar component $y^p_f$ of surface free energy of reinforcing fiber=$a^2$

Non-polar component $y^d_f$ of surface free energy of reinforcing fiber=$b^2$

Total surface free energy $y_f$=$a^2$+$b^2$

The polar component and non-polar component of the surface tension of each solvent is as described below.

Purified water surface tension 72.8 mJ/$m^2$, polar component 51.0 mJ/$m^2$, non-polar component 21.8 (mJ/$m^2$)

Ethylene glycol surface tension 48.0 mJ/$m^2$, polar component 19.0 mJ/$m^2$, non-polar component 29.0 (mJ/$m^2$)

Tricresol phosphate surface tension 40.9 mJ/$m^2$, polar component 1.7 mJ/$m^2$, non-polar component 39.2 (mJ/$m^2$)

In regard to the form and the way of alignment of the reinforcing fiber to use, an appropriate form may be selected from among a bundle of reinforcing fibers paralleled in one direction, a laminate of filaments paralleled in one direction, woven fabric, knit fabric, nonwoven fabric, mat, and braid, but in order to obtain a fiber-reinforced resin that is light in weight and higher in durability, it is preferable to use a prepreg in which the reinforcing fiber is in the form of continuous fibers such as long fibers (fiber bundles) paralleled in one direction and woven fabric. In addition, other forms containing discontinuous reinforcing fibers such as nonwoven fabric and mat may also be preferable from the viewpoint of shapability and shape conformity during molding.

For the prepreg according to the present invention, the quantity of reinforcing fibers per unit area is preferably 30 g/$m^2$ or more and 2,000 g/$m^2$ or less. If this quantity of reinforcement fibers is 30 g/$m^2$ or more, a less number of layers are required to ensure a required thickness when molding a fiber-reinforced resin, possibly facilitating the operations. If the quantity of reinforcing fibers is 2,000 g/$m^2$ or less, on the other hand, it serves to produce a prepreg with improved draping properties.

The content by mass of the reinforcing fiber in the prepreg according to the present invention is preferably 30 mass % or more and 90 mass % or less, more preferably 35 mass % or more and 85 mass % or less, and still more preferably 40 mass % or more and 80 mass % or less. If the content by mass of the reinforcing fiber is 30 mass % or more, the quantity of resin is not excessively large relative to fiber, making it easy to produce a fiber-reinforced resin molding that has a high specific strength and a high specific elastic modulus and will not generate excessive heat when being cured. If the content by mass of the reinforcing fiber is 90 mass % or less, defective impregnation with resin will be less likely to occur, serving to easily decrease the number of voids in the resulting fiber-reinforced resin.

<Prepreg Having Thermoplastic Resin Region at Surface>

Furthermore, the prepreg according to the present invention preferably has a thermoplastic resin region at the surface. The application of the epoxy resin composition according to the present invention to such a prepreg having a thermoplastic resin region at the surface serves to prevent the thermosetting resin from being damaged by the heat used for welding to another member as described above. There are no specific limitations on the thermoplastic resin contained in such a thermoplastic resin region, but examples thereof include polyester based resins (such as polyethylene terephthalate, polybutylene terephthalate, polytrimethylene terephthalate, polyethylene naphthalate, and liquid crystal polyester), polyolefin based resins (such as polyethylene, polypropylene, and polybutylene), styrene based resins, polyurethane resin, polyoxymethylene, polyamide based resins (such as polyamide 6, polyamide 66, other similar aliphatic polyamides, semi-aromatic polyamides, and alicyclic polyamides), polycarbonate, polymethyl methacrylate, polyvinyl chloride, polyphenylenesulfide, polyphenylene ether, modified polyphenylene ether, polyimide, polyamide-imide, polyetherimide, polysulfone, modified polysulfone, polyethersulfone, polyketone, polyarylene ether ketones (such as polyetherketone, polyetheretherketone, and polyetherketoneketone), polyallylate, polyethernitrile, phenol based resins, and phenoxy resin. In addition, copolymers and modifications of the thermoplastic resins listed above and/or resin blends of two or more of these resins may also be used. Of these, polyketone, polyetherketone, polyetheretherketone, polyetherketoneketone, other similar polyarylene ether ketones, alicyclic polyamide, semi-aromatic polyamide, polyphenylenesulfide, polyetherimide, polyethersulfone, polysulfone, modified polysulfone, and polyamideimide are particularly preferable because they serve to produce fiber-reinforced resin moldings with high heat resistance.

In particular, the prepreg according to the present invention, it is preferable that the thermosetting resin thermosetting resin region containing the epoxy resin composition and the surface thermoplastic resin region be in the form of layers disposed adjacent to each other. The expression "in the form of layers disposed adjacent to each other" refers to a state wherein as illustrated in the FIGURE, for example, which shows a cross-section exposed by cutting a prepreg perpendicularly to its plane direction, a region 2 containing a thermoplastic resin and a thermosetting resin region 3 containing an epoxy resin composition (or its cured product) that are continuous in in-plane directions are disposed in close contact with each other while sharing an interface 5. If the thermoplastic resin is in the form of particles, fibers, nonwoven fabric, etc., instead of a continuous layer, the areal proportion of the epoxy resin exposed at the surface will increase while the proportion of the area of the outermost face covered by the thermoplastic resin will decline, leading to a larger decrease in weldability. Hereinafter, in the case where the "thermosetting resin region 3 containing an epoxy resin composition (or its cured product)" is a thermosetting resin region containing a cured epoxy resin, it will be occasionally referred to as thermosetting resin region 3.

The areal weight of the thermoplastic resin region is preferably 10 $g/m^2$ or more because in that case, a large joining strength will be developed with the adherend. The areal weight of the thermoplastic resin region is more preferably 20 $g/m^2$. There are no specific limitations on the upper limit, but the areal weight of the thermoplastic resin region is preferably 500 $g/m^2$ or less in order to produce a fiber-reinforced resin with high specific strength and high specific elastic modulus while preventing the quantity of the thermoplastic resin from being excessively large relative to the reinforcing fiber. Here, the areal weight of the thermoplastic resin region means the mass (g) of the thermoplastic resin present in the thermoplastic resin region contained in 1 $m^2$ of the prepreg.

In addition, for the cross-sectional profile curve formed by the interface where the two resin regions are in contact with each other in a cross-section produced by cutting the prepreg perpendicularly to its plane direction, the roughness average length RSm and the roughness average height Rc that are defined in JIS B0601 (2001) are preferably 100 μm or less and 3.5 μm or more, respectively. If the roughness average length RSm of the cross-sectional profile curve is 100 μm or less, it is preferable because not only chemical and/or physical bonding forces but also a mechanical bonding force developed by entanglement occurs to make it difficult for the resin region containing an epoxy resin composition and the resin region containing a thermoplastic resin to be separated easily. There are no specific limitations on the lower limit of RSm, but it is preferably 15 μm or more in order to avoid a decrease in the mechanical bonding force attributable to stress concentration. In addition, if the roughness average height Rc of the cross-sectional profile curve is 3.5 μm or more, it is preferable because it serves to allow the adhesive strength between the resin region containing a cured epoxy resin produced by heat-curing and the resin region containing a thermoplastic resin to be increased as a result not only of the development of a mechanical bonding force attributable to entanglement but also of chemical and/or physical bonding of the reinforcing fibers existing at the interface to the cured epoxy resin produced by heat-curing and the thermoplastic resin. The roughness average height Rc of the cross-sectional profile curve is more preferably 10 μm or more, and particularly preferably 20 μm or more, where the reinforcing fiber comes more easily into contact with both resin regions to achieve stronger adhesion. There are no specific limitations on the upper limit of Rc, but it is preferably 100 μm or less in order to avoid a decrease in the mechanical bonding force attributable to stress concentration.

Here, the roughness average height Rc and the roughness average length RSm of a cross-sectional profile curve can be measured by an appropriate generally known method. Examples thereof include the method of curing the epoxy resin and then determining it from a cross-sectional image observed by an X-ray CT scanner, the method of determining them from an elemental mapping image observed by an energy dispersive X-ray spectroscope (EDS), and the method of determining them from a cross-sectional image observed by an optical microscope, scanning electron microscope (SEM), or transmission electron microscope (TEM). For these observations, the epoxy resin and/or the thermoplastic resin may be stained to adjust the contrast. In an image obtained by any of the above methods, the roughness average height Rc and the roughness average length RSm of a cross-sectional profile curve are determined from an area 500 μm square.

The FIGURE illustrates a typical method (measuring method 1 for elements of cross-sectional profile curve) for measuring the roughness average height Rc and the roughness average length RSm of a cross-sectional profile curve. The edge 6 of a rectangular observed image 4 that is in the resin region containing a cured epoxy resin is adopted as reference line, and perpendicular guidelines 7, each extending from the thermosetting resin region 3 containing an epoxy resin composition (or its cured product) into the resin region 2 containing a thermoplastic resin, are drawn at intervals of 5 μm. A cross-sectional profile curve 8 is defined by plotting the points where each perpendicular guideline drawn from the reference line intersects the thermoplastic resin for the first time and connecting the plotted points. The resulting cross-sectional profile curve 8 is then subjected to filtering as specified in JIS B0601 (2001), and the average roughness height Rc and the average roughness length RSm of the cross-sectional profile curve 8 are calculated.

Furthermore, in the prepreg according to the present invention, it is preferable that there exist a thermosetting resin region at the surface of the prepreg and also that there exist reinforcing fibers that are across the interface between the thermosetting resin region and the thermoplastic resin region and are in contact with both resin regions. The existence of such reinforcing fibers can be confirmed by observing a cross-section prepared by cutting a sample perpendicularly to the plane direction. For example, in the observed image 4 of a cross-section shown in the FIGURE, a plurality of reinforcing fibers 1 is present on the interface 5 between the resin region 2 containing a thermoplastic resin and the thermosetting resin region 3 containing an epoxy resin composition (or its cured product). Each reinforcing fiber 1 present on the interface 5 is in contact with both the region 2 containing a thermoplastic resin and the thermosetting resin region 3 containing an epoxy resin composition (or its cured product). Such a state in which reinforcing fibers are surrounded by and in contact with the thermoplastic resin and the epoxy resin can be regarded as a state in which the reinforcing fibers "are across the interface and are in contact with both resin regions."

The existence of reinforcing fibers that are across the interface between the thermosetting resin region and the thermoplastic resin region and are in contact with both resin regions serves to improve the strength of the thermoplastic resin region and increase the joining strength. In addition, the reinforcing fibers being across the interface form chemical and/or physical bonding with the cured epoxy resin produced by heat-curing and the thermoplastic resin and this also serves to improve the adhesion between the thermosetting resin region and the thermoplastic resin region after the heat-curing step and increase the joining strength.

In order to allow the prepreg according to the present invention to have an enhanced impact resistance, an elastomer or rubber component may be added to the epoxy resin or the thermoplastic resin. In addition, depending on intended uses, the epoxy resin or the thermoplastic resin may contain other fillers or additives unless they impair the purpose of the present invention. Examples thereof include inorganic fillers, flame retardants, electric conductivity developing agents, crystal nucleating agents, ultraviolet absorbers, antioxidants, vibration damping agents, antibacterial agent, insecticides, deodorants, color protection agents, thermal stabilizers, mold releasing agents, antistatic agents, plasticizers, lubricants, coloring agents, pigments, dyes, foaming agents, bubble control agents, and coupling agents.

<Fiber-Reinforced Resin Molding>

The fiber-reinforced resin molding according to another aspect of the present invention (herein after referred to as the fiber-reinforced resin molding according to the present invention) includes a reinforcing fiber and a matrix resin produced by curing the epoxy resin composition according to the present invention.

The fiber-reinforced resin molding according to the present invention is not limited to any particular intermediate that is used as a material therefor, but typically, a fiber-reinforced resin molding containing a layer produced by curing the aforementioned prepreg according to the present invention is a preferable example. Such a fiber-reinforced resin molding is produced by forming a preform including the prepreg according to the present invention along with other prepreg layers laid thereon and curing it by heating under pressure. Useful techniques for heating under pressure include press molding, autoclave molding, bag molding, wrapping tape molding, internal pressure molding, hand lay-up molding, filament winding molding, pultrusion molding, resin injection molding, and resin transfer molding. A fiber-reinforced resin molding produced in this way has a layer formed by curing the prepreg according to the present invention. Description of the structural feature of the layer is omitted here because it is the same as for the aforementioned prepreg except that the thermosetting resin region is in a cured state.

In particular, a fiber-reinforced resin molding that is produced from the prepreg according to the present invention having a thermoplastic resin region at the surface by curing a layered sheet containing the prepreg with the thermoplastic resin region exposed at the surface, that is, a fiber-reinforced resin molding in which a layer formed by curing the prepreg is disposed so that the thermoplastic resin region is exposed at the surface, is a preferable example because an integrated product can be produced by welding the surface thermoplastic resin region to another member via the thermoplastic resin. Hereinafter, such another member will be occasionally referred to as an adherend. Here, there are no specific limitations on such an "adherend". It may be, for example, a member containing a thermoplastic resin or a member made of a metal material, and the adherend itself may also be of the fiber-reinforced resin molding according to the present invention.

EXAMPLES

The invention is described in more detail below with reference to examples. However, it should be noted that the scope of the present invention is not limited to these examples. Hereinafter, the unit "part" used to refer to the proportion of a component means "part by mass" unless otherwise specified. The various measurements were performed in an environment at a temperature of 23° C. and a relative humidity of 50% unless otherwise specified.

Materials Used in Examples and Comparative Examples

[Epoxy Resin]

- naphthylene ether type epoxy resin (EPICLON® HP-6000, manufactured by DIC Corporation, epoxy equivalent weight 250 g/eq)
- biphenyl aralkyl type epoxy resin (NC-3000, manufactured by Nippon Kayaku Co., Ltd., epoxy equivalent weight 275 g/eq)
- tetraglycidyl diaminodiphenylmethane (SUMI-EPDXY® ELM434, manufactured by Sumitomo Chemical Co., Ltd., epoxy equivalent weight 120 g/eq)
- bisphenol F type epoxy resin (EPICLON® 830, manufactured by DIC Corporation, epoxy equivalent weight 172 (g/eq))
- naphthalene diol type epoxy resin (EPICLON® HP-4032, manufactured by DIC Corporation, epoxy equivalent weight 145 g/eq)
- naphthol phenyl aralkyl type epoxy resin (NC-7300L, manufactured by Nippon Kayaku Co., Ltd., epoxy equivalent weight 210 g/eq)
- naphthol phenyl aralkyl type epoxy resin (NC-7000L, manufactured by Nippon Kayaku Co., Ltd., epoxy equivalent weight 230 g/eq)

[Polyamine Compound]

- 4,4'-diaminodiphenyl sulfone (SEIKACURE S, manufactured by Wakayama Seika Kogyo Co., Ltd., active hydrogen equivalent weight 62 g/eq)

diethyl toluene diamine (Aradur® 5200, manufactured by Huntsman Advanced Materials, active hydrogen equivalent weight 45 g/eq)

[Other Curing Agents]

1-isobutyl-2-methyl imidazole (IBMI12, manufactured by Mitsubishi Chemical Corporation)

[Viscosity Modifier (Thermoplastic Resin Soluble in Epoxy Resin)]

polyethersulfone (Sumika Excel® PES5003P, manufactured by Sumitomo Chemical Co., Ltd.)

[Reinforcing Fiber]

Carbon fiber bundles to be used in common as material was produced by the method described below and then various sizing agent compounds were applied to provide carbon fibers 1 to 6. First, an acrylonitrile copolymer produced by copolymerization with itaconic acid was spun and calcined to prepare a carbon fiber bundle containing a total of 24,000 filaments and having a specific gravity of 1.8 g/cm 3, a strand tensile strength of 5.9 GPa, and a strand tensile modulus of 294 GPa. Then, various sizing agent compounds were mixed with acetone to prepare solutions of about 1 mass % in which the compounds were dissolved uniformly. Each compound was applied to a carbon fiber bundle by the immersion method and heat-treated at 210° C. for 90 seconds, followed by adjusting the amount of the compound so that the compound accounted for 0.5 part by mass relative to 100 parts by mass of the carbon fiber on which the compound was adhered. The sizing agent compound used for each carbon fiber and the surface free energy after coating with the sizing agent were as described below.

carbon fiber 1: polyethylene glycol diglycidyl ether (DENACOL® EX-841, manufactured by Nagase ChemteX Corporation), surface free energy 20 $mJ/m^2$ carbon fiber 2: bisphenol A type diglycidyl ether (jER® 828, manufactured by Mitsubishi Chemical Corporation), surface free energy 9 $mJ/m^2$ carbon fiber 3: sorbitol polyglycidyl ether (DENACOL® EX-614B, manufactured by Nagase ChemteX Corporation), surface free energy 32 $mJ/m^2$ carbon fiber 4: bisphenol A type propylene oxide 24 moles adduct, surface free energy 18 $mJ/m^2$ carbon fiber 5: polyallyl amine (PAA-01, manufactured by Nippon Shokubai Co., Ltd.), surface free energy 32 $mJ/m^2$ carbon fiber 6: polyethylene imine (SP-012, manufactured by Nippon Shokubai Co., Ltd.), surface free energy 33 $mJ/m^2$

[Thermoplastic Resin]

PPS: film with an areal weight of 120 $g//m^2$ made of polyphenylenesulfide (Torelina® A900 (manufactured by Toray Industries, Inc., melting point 278° C., glass transition temperature 92° C.))

PEEK: film with an areal weight of 120 $g/m^2$ made of polyetheretherketone (PEEK 450G, manufactured by Victrex, melting point 343° C., glass transition temperature 143° C.)

PEKK: film with an areal weight of 120 $g/m^2$ made of polyetherketoneketone (KEPSTAN® 6002, manufactured by Arkema K. K., melting point 300° C., glass transition temperature 160° C.)

PEI: film with an areal weight of 120 $g/m^2$ made of polyetherimide (ULTEM® 1010, manufactured by SABIC, glass transition temperature 217° C.)

semi-aromatic PA: film with an areal weight of 120 $g/m^2$ made of polyamide 6T (melting point 320° C., glass transition temperature 125° C.)

Here, the melting point of each thermoplastic resin was measured using a differential scanning calorimeter (DSC) according to JIS K7121 (2012). If a plurality of melting points was observed, such as in the case of a mixture, the highest melting point was adopted as the melting point of the thermoplastic resin.

<Evaluation Methods>

[Characteristics of Cured Epoxy Resin]

The epoxy resin composition prepared in each Example and Comparative example was injected in a mold, heated in a hot air drier from 30° C. to 180° C. at a rate of 1.5° C./min, heat-cured for 120 minutes, and cooled to 30° C. at a rate of 2.5° C./min to prepare a plate-like cured epoxy resin with a thickness of 2 mm.

A test piece with a width of 12.7 mm and a length of 45 mm was cut out from the cured resin plate prepared by the above method, and then the test piece was dried in a vacuum oven at 60° C. for 24 hours and subjected to dynamic viscoelasticity test according to JIS K7244-7 (2007) to provide a storage elastic modulus curve. In this storage elastic modulus curve, the temperature at the intersection of the tangent line in the glass state and the tangent line in the transition state was adopted as the glass transition temperature.

In addition, a plate-like cured resin prepared by the above method was crushed and an evaluation sample of about 10 mg was taken and subjected to measurement of the rate of mass loss on heating according to JIS K7120 (1987) using a thermogravimetric differential thermal analyzer. In all measuring runs, furthermore, air was used as the inflow gas. For the determination of the rate of mass loss on heating in the heating processes from room temperature to 300° C. and from room temperature to 350° C., the temperature was raised at a temperature ramp rate of 50° C./min over a measuring temperature range from 25° C. to 400° C. and the rate of mass loss on heating was measured when the temperature reached 300° C. or 350° C. For isothermal measurement, heating was started from 200° C. and, after reaching a temperature of 300° C., the sample was maintained at 300° C. for 2 minutes, followed by measuring the rate of mass loss on heating.

[Structure Observation of Prepreg and Fiber-Reinforced Resin Molding]

A cross-section for observation was prepared by cutting a prepreg perpendicularly to the plane direction and observed under an optical microscope to provide a photographed image taken at a magnification of 1,000 times. In the case where, in the image obtained, reinforcing fibers were present at the interface between the thermoplastic resin region and the thermosetting resin region containing the epoxy resin and also where the reinforcing fibers were in contact with both the thermoplastic resin region and the thermosetting resin region containing the epoxy resin, it was considered that there exited a state in which "reinforcing fibers were across the interface between the two resin regions while being in contact with them". In an observation area 500 μm square randomly selected in the image obtained, the roughness average length RSm and the roughness average height Rc defined in JIS B0601 (2001) were calculated for elements of the cross-sectional profile curve determined by the measuring method 1 for elements of cross-sectional profile curve. In the case of a fiber-reinforced resin molding as well, a cross-section for observation was prepared by cutting it perpendicularly to the plane direction and observed under an optical microscope to provide a photographed image taken at a magnification of 1,000 times, followed by taking measurements in the same way as for the prepreg described above.

[Compression Strength of Fiber-Reinforced Resin Molding]

A tab was bonded to the resulting fiber-reinforced resin according to SACMA-SRM 1R-94, and then a rectangular test piece with a length of 80 mm and a width of 15 mm was cut out in such a manner that the axis direction of the reinforcing fibers coincided with the length direction of the test piece. After drying in a vacuum oven at 60° C. for 24 hours, the test piece prepared above was subjected to compression strength test that was performed according to SACMA-SRM 1R-94 using a universal testing machine (Instron® 5565-type P8564, manufactured by Instron Japan Co., Ltd.) under the three different sets of measuring conditions specified below.

1) The test piece was not treated particularly and measurement of its compression strength was performed in an environment at 23° C. (non-treatment conditions)
2) The test piece was subjected to high temperature exposure treatment in which it was held for 2 minutes between heated plates maintained at 300° C., and measurement of its compression strength was performed in an environment at 23° C.
3) The test piece was subjected to water absorption treatment in which it was immersed in hot water at 71° C. for 14 days, and measurement of its compression strength was performed in a high temperature environment at 120° C.

An evaluation of the test piece was made as described below based on the measurement results obtained in the above section 2). Results are shown in Tables 2 to 5.

1.4 GPa or more: A
1.2 GPa or more and less than 1.4 GPa: B
1.0 GPa or more and less than 1.2 GPa: C
less than 1.0 GPa: D (unacceptable)

Furthermore, an evaluation of the test piece was made as described below based on the results of measurement obtained in the above section 3). Results are shown in Tables 2 to 5.

1.2 GPa or more: A
1.0 GPa or more and less than 1.2 GPa: B
0.8 GPa or more and less than 1.0 GPa: C
less than 0.8 GPa: D (unacceptable)

[Tensile Shear Joining Strength of Integrated Product]

An integrated product was prepared and a tab was bonded thereto according to ISO4587:1995 (JIS K6850 (1994)), followed by cutting it to a width of 25 mm to provide a test piece as designed.

The resulting test piece was dried in a vacuum oven for 24 hours and subjected to measurement of the tensile shear joining strength at an environmental temperature of 23° C. according to ISO4587:1995 (JIS K6850 (1994)), followed by its evaluation as described below based on the results of measurement. The coefficient of variation was determined by calculating the standard deviation and average of five measurements of the tensile shear joining strength and dividing the standard deviation by the average. Results are shown in Table.

28 MPa or more: A
MPa or more and less than 28 MPa: B
MPa or more and less than 25 MPa: C
less than 20 MPa: D (unacceptable)

<Epoxy Resin Composition>

The epoxy resin and viscosity modifier specified in Table 1 were put in a kneading device and heated and kneaded to dissolve the viscosity modifier (although the addition of the viscosity modifier was omitted in some cases). Here, the FIGURES given in Table 1 to show the proportions of these components are in parts by mass relative to the total quantity of the epoxy resins, which represents 100 parts by mass. Subsequently, while continuing the kneading operation, the temperature was lowered to 100° C. or less and a polyamine compound specified in Table 1 was added along with a properly selected curing agent, followed by stirring. Epoxy resin compositions were prepared in this way.

TABLE 1-1

| | | | Example 1 | Example 2 | Example 3 | Example 4 | Example 5 | Example 6 | Example 7 | Example 8 |
|---|---|---|---|---|---|---|---|---|---|---|
| epoxy resin composition | epoxy resin/ epoxy equivalent weight (g/eq) | EPICLON HP-6000/250 | 50 | | 35 | 50 | 75 | 100 | | 50 |
| | | NC-3000/275 | | 50 | | | | | | |
| | | ELM434/120 | 50 | 50 | 65 | | 25 | | 50 | 50 |
| | | EPICLON830/172 | | | | 50 | | | | |
| | | HP-4032/145 | | | | | | | | |
| | | NC-7300 L/210 | | | | | | | | |
| | | NC-7000 L/230 | | | | | | | 50 | |
| | polyamine compound | 4,4'-diaminodiphenyl sulfone | 38 | 37 | 42 | 30 | 32 | 25 | 39 | 38 |
| | | diethyl toluene diamine | | | | | | | | |
| | other curing agent | IBMI12 | | | | | | | | |
| | viscosity modifier | PES5003 P | 10 | 10 | 10 | 10 | 10 | 10 | 10 | — |
| | average epoxy equivalent weight (g/eq) | | 185 | 198 | 166 | 211 | 218 | 250 | 175 | 185 |
| | average active hydrogen equivalent weight (g/eq) | | 62 | 62 | 62 | 62 | 62 | 62 | 62 | 62 |
| properties of cured epoxy resin | | glass transition temperature (° C.) | 214 | 197 | 220 | 201 | 205 | 199 | 191 | 214 |
| | | room temperature→300° C. rate of mass loss on heating (%) | 0.68 | 0.89 | 0.93 | 0.52 | 0.49 | 0.37 | 0.90 | 0.70 |
| | | room temperature→350° C. rate of mass loss on heating (%) | 1.14 | 1.57 | 1.65 | 0.95 | 0.82 | 0.50 | 1.62 | 1.16 |
| | | rate of mass loss on heating after heating at 300° C. for 2 min (%) | 0.38 | 0.53 | 0.77 | 0.23 | 0.17 | 0.07 | 0.71 | 0.40 |

TABLE 1-2

| | | | Comparative example 1 | Comparative example 2 | Comparative example 3 | Comparative example 4 | Comparative example 5 | Comparative example 6 |
|---|---|---|---|---|---|---|---|---|
| epoxy resin composition | epoxy resin/ epoxy equivalent weight (g/eq) | EPICLON HP-6000/250 | | | | 35 | | 35 |
| | | NC-3000/275 | | | 100 | | | |
| | | ELM434/120 | 50 | 50 | | 65 | 65 | 65 |
| | | EPICLON830/172 | 50 | | | | | |
| | | HP-4032/145 | | 50 | | | | |
| | | NC-7300 L/210 | | | | | 35 | |
| | | NC-7000 L/230 | | | | | | |
| | polyamine compound | 4,4'-diaminodiphenyl sulfone | 44 | 48 | 23 | — | 44 | |
| | | diethyl toluene diamine | | | | — | | 31 |
| | other curing agent | IBMI12 | | | | 2 | | |
| | viscosity modifier | PES5003 P | 10 | 10 | 10 | 10 | 10 | 10 |
| | average epoxy equivalent weight (g/eq) | | 146 | 132 | 275 | 166 | 152 | 166 |
| | average active hydrogen equivalent weight (g/eq) | | 62 | 62 | 62 | 62 | 62 | 45 |
| properties of cured epoxy resin | | glass transition temperature (° C.) | 209 | 221 | 168 | 188 | 207 | 203 |
| | | room temperature→300° C. rate of mass loss on heating (%) | 1.30 | 1.45 | 0.61 | 1.26 | 1.28 | 1.19 |
| | | room temperature→350° C. rate of mass loss on heating (%) | 2.30 | 2.52 | 1.05 | 2.16 | 2.20 | 2.06 |
| | | rate of mass loss on heating after heating at 300° C. for 2 min (%) | 1.16 | 1.30 | 0.42 | 1.12 | 1.23 | 1.10 |

<Prepreg, Fiber-Reinforced Resin Molding, and Integrated Product>

Experimental Example 1: Influence of Epoxy Resin Composition

An epoxy resin composition was spread over a piece of release paper using a knife coater in such a manner that the areal weight of resin was 100 g/m$^2$, thereby forming an epoxy resin film. (An epoxy resin film with the same areal weight was prepared in the same way in each of Examples 2 to 4, 6 and Comparative examples 1 to 4.) A reinforcing fiber sheet (with an areal weight of 193 g/m$^2$) containing filaments of the carbon fiber 1 aligned in one direction was pulled out and, while driving it to travel in a direction, a resin sheet of a thermoplastic resin (PPS) with an areal weight of 120 g/m$^2$ was supplied onto the reinforcing fiber sheet. Then, the thermoplastic resin was heated and melted using an IR heater so that it was adhered over one entire surface of the reinforcing fiber sheet. Then, it was pressed by a nip roll having a surface temperature that was lower by 100° C. than the melting point of the thermoplastic resin in order to impregnate the reinforcing fiber sheet with PPS, followed by cooling to provide an intermediate material. Next, the aforementioned epoxy resin film was laid over that surface of the intermediate material that was opposite to the one impregnated with the thermoplastic resin, and the intermediate material was impregnated with the epoxy resin composition while heating and pressing using a heat roll device, thereby providing a prepreg [I].

An epoxy resin composition was spread over a piece of release paper using a knife coater in such a manner that the areal weight of resin was 50 g/m$^2$, thereby forming an epoxy resin film. (An epoxy resin film with the same areal weight was prepared in the same way in each of Examples 2 to 4, 6 and Comparative examples 1 to 4.) Sheets of this epoxy resin film were attached to both sides of a reinforcing fiber sheet (with an areal weight of 193 g/m$^2$) containing the carbon fiber 1 arranged in one direction, and the reinforcing fiber was impregnated with the epoxy resin composition while heating and pressing them using a heat roll device, thereby providing a prepreg [II].

The prepregs [I] and [II] prepared as described above were cut to predetermined size to provide two sheets of the prepreg [I] and four sheets of the prepreg [II]. A six layer laminate was prepared in which the two sheets of the prepreg [I] formed the outermost layer of each of the two sides, with the sheets of the prepreg [II] being interposed in between, to produce a preform in which all reinforcing fibers were aligned in the same direction. Here, the lamination was performed so that the two outermost layers on both sides of the preform were prepreg [I] sheets and that both outermost surfaces of the preform were covered with thermoplastic resin (PPS) layers. Specifically, two sheets of the prepreg [I] sandwiched four sheets of the prepreg [II], and the PPS-impregnated surface of each prepreg [I] sheet constituted each outermost surface. This preform was set in a press mold, and while maintaining this shape using jigs and spacers as required, it was heated at 180° C. for 120 minutes under a pressure of 0.6 MPa applied by a pressing machine, thereby providing a fiber-reinforced resin for compression strength evaluation and cross-sectional observation.

The prepregs [I] and [II] prepared as described above were cut to predetermined size to provide two sheets of the prepreg [I] and six sheets of the prepreg [II]. Defining the axis direction of the reinforcing fiber as 0° and defining the direction perpendicular to the axis as 90°, layers were laminated in the structure of $[0°/90°]_{2s}$ (the symbol s denotes mirror symmetry) to form a preform. Here, the lamination was performed so that the two outermost layers on both sides of the preform were prepreg [I] sheets and that both outermost surfaces of the preform were covered with thermoplastic resin (PPS) layers. Specifically, two sheets of the prepreg [I] sandwiched six sheets of the prepreg [II], and the PPS-impregnated surface of each prepreg [I] sheet constituted each outermost surface. This preform was set in a press mold, and while maintaining this shape using jigs and spacers as required, it was heated at 180° C. for 120 minutes under a pressure of 0.6 MPa applied by a pressing machine, thereby providing a fiber-reinforced resin molding for tensile shear joining strength evaluation.

In addition, the resulting fiber-reinforced resin for tensile shear joining strength evaluation was cut to provide two test pieces having a shape with a width of 250 mm and a length of 92.5 mm, wherein the 0° direction is the length direction of the test pieces, and they were dried for 24 hours in a vacuum oven. Then, the two panels cut to a shape with a width of 250 mm and a length of 92.5 mm were laid one on the other, with the 0° direction coinciding the length direction, to prepare a stack with a width of 250 mm and a length of 12.5 mm, which was maintained at 300° C. for 2 minutes under a pressure of 3 MPa to weld the surface layers in contact with each other, thereby providing an integrated product for tensile shear joining strength evaluation.

Table 2 shows results of evaluation for physical properties etc. of the prepregs, fiber-reinforced resin moldings, and integrated products.

TABLE 2

| | epoxy resin composition | Example 1 | Example 2 | Example 3 | Example 4 | Example 6 | Comparative example 1 | Comparative example 2 | Comparative example 3 | Comparative example 4 |
|---|---|---|---|---|---|---|---|---|---|---|
| thermoplastic resin | | PPS | | | | | | | | |
| reinforcing fiber | | carbon fiber 1 | | | | | | | | |
| prepreg | reinforcing fibers being across interface between and in contact with two resin regions | existence | | | | | | | | |
| | roughness average length RSm at interface (μm) | 47 | 46 | 45 | 45 | 46 | 47 | 43 | 45 | 45 |
| | roughness average height Rc at interface (μm) | 23 | 24 | 22 | 21 | 22 | 23 | 24 | 22 | 21 |
| fiber-reinforced resin molding | reinforcing fibers being across interface between and in contact with two resin regions | existence | | | | | | | | |
| | roughness average length RSm at interface (μm) | 48 | 49 | 48 | 47 | 44 | 45 | 46 | 42 | 45 |
| | roughness average height Rc at interface (μm) | 21 | 22 | 22 | 20 | 25 | 24 | 26 | 20 | 20 |
| fiber-reinforced resin molding | 1) compression strength (non-treatment conditions) (GPa) | 1.62 | 1.58 | 1.64 | 1.55 | 1.60 | 1.56 | 1.58 | 1.51 | 1.55 |
| | 120° C. | 9.1 | | | | | 9.1 | | | |
| | 2) compression strength after exposure to 300° C. (GPa) | A 1.58 | A 1.51 | A 1.50 | A 1.54 | A 1.60 | D 0.55 | D 0.59 | A 1.43 | D 0.52 |
| | 3) compression strength at 120° C. after water absorption (GPa) | A 1.22 | B 1.15 | A 1.20 | A 1.20 | A 1.28 | B 1.16 | A 1.20 | D 0.74 | C 0.92 |
| integrated product | tensile shear joining strength (MPa) | B 27.1 | B 26.9 | B 26.7 | B 27.3 | B 27.3 | D 18.6 | D 19.3 | B 25.8 | D 18.2 |
| | coefficient of variation in tensile shear joining strength (CV) (%) | 4.7 | 4.9 | 4.9 | 4.8 | 4.7 | 5.2 | 5.1 | 5.2 | 5.1 |

[Experimental example 2: Influence of thermoplastic resin species] The epoxy resin compositions prepared in Example 1 and Comparative examples 1 and 2 were used. The thermoplastic resin species were replaced as specified in Table 3, and accordingly the welding temperatures for producing integrated products were changed as specified in Table 3. Except for these, the same procedure as Experimental example 1 was carried out to produce fiber-reinforced resin moldings and integrated products. Table 3 shows results of evaluation for physical properties etc. of the prepregs, fiber-reinforced resin moldings, and integrated products.

TABLE 3

| | epoxy resin composition | Example 1 | | | | | Comparative example 1 | Comparative example 2 |
|---|---|---|---|---|---|---|---|---|
| thermoplastic resin | | PPS | PEEK | PEKK | PEI | semi-aromatic PA | PEEK | PEKK |
| reinforcing fiber | | carbon fiber 1 | | | | | | |
| prepreg | reinforcing fibers being across interface between and in contact with two resin regions | existence | existence | existence | existence | existence | existence | existence |
| | roughness average length RSm at interface (μm) | 47 | 44 | 43 | 45 | 45 | 46 | 47 |
| | roughness average height Rc at interface (μm) | 23 | 22 | 21 | 22 | 22 | 22 | 22 |
| fiber-reinforced resin molding | reinforcing fibers being across interface between and in contact with two resin regions | existence | existence | existence | existence | existence | existence | existence |
| | roughness average length RSm at interface (μm) | 50 | 47 | 42 | 47 | 44 | 44 | 48 |
| | roughness average height Rc at interface (μm) | 22 | 21 | 23 | 22 | 22 | 23 | 23 |
| fiber-reinforced | 1) compression strength (non-treatment conditions) (GPa) | 1.62 | 1.63 | 1.63 | 1.62 | 1.61 | 1.58 | 1.58 |

TABLE 3-continued

| | epoxy resin composition | Example 1 | | | | | Comparative example 1 | Comparative example 2 |
|---|---|---|---|---|---|---|---|---|
| resin molding | 2) compression strength after exposure to 300° C. (GPa) | A<br>1.58 | A<br>1.60 | A<br>1.60 | A<br>1.59 | A<br>1.58 | D<br>0.57 | D<br>0.56 |
| | 3) compression strength at 120° C. after water absorption (GPa) | A<br>1.22 | A<br>1.23 | A<br>1.23 | A<br>1.22 | A<br>1.21 | B<br>1.18 | B<br>1.18 |
| integrated product | welding temperature (° C.) | 300 | 360 | 320 | 300 | 320 | 360 | 320 |
| | tensile shear joining strength (MPa) | B<br>27.1 | A<br>30.4 | A<br>30.1 | A<br>29.1 | A<br>30.1 | D<br>15.2 | D<br>16.1 |
| | coefficient of variation in tensile shear joining strength (CV) (%) | 4.7 | 4.8 | 4.7 | 4.7 | 4.7 | 5.0 | 5.0 |

Experimental Example 3: Influence of Reinforcing Fibers being Across Thermosetting Resin Region and Thermoplastic Resin Region A fiber-reinforced resin molding containing reinforcing fibers that were across the interface between the two resin regions and were in contact with them was prepared in the same way as in Experimental example 2. In addition, a fiber-reinforced resin molding containing no reinforcing fibers that were across the interface between the two resin regions and were in contact with them was prepared by the procedure described below. A prepreg [II] was produced from the epoxy resin composition prepared in Example 1 by the same procedure as in Experimental example 1 and cut it into sheets of a predetermined size. A total of six sheets were laminated in such a manner that all reinforcing fibers were aligned in the same direction, and then PPS films with an areal weight of 120 g/m$^2$ were attached to both surface to provide a preform. Following this, it was heated and pressed using a pressing machine in the same way as in Experimental example 1 to produce a fiber-reinforced resin molding for compression strength evaluation and cross-sectional observation.

The prepreg [II] obtained above was cut into sheets of a predetermined size. Defining the axis direction of the reinforcing fiber as 0° and defining the direction perpendicular to the axis as 90°, layers were laminated in the structure of $[0°/90°]_{2s}$ (the symbol s denotes mirror symmetry) and PPS films with an areal weight of 120 g/m$^2$ were attached to both surface to provide a preform. Following this, it was heated and pressed using a pressing machine in the same way as in Experimental example 1 to produce a fiber-reinforced resin molding for tensile shear joining strength evaluation and welded in the same way as in Experimental example 1 to provide an integrated product.

Table 4 shows results of evaluation for physical properties etc. of the prepreg, fiber-reinforced resin molding, and integrated product.

TABLE 4

| | epoxy resin composition | Example 1 | |
|---|---|---|---|
| | thermoplastic resin | PPS | |
| | reinforcing fiber | carbon fiber 1 | |
| prepreg | reinforcing fibers being across interface between and in contact with two resin regions | existence | absence |
| | roughness average length RSm at interface (μm) | 47 | 183 |
| | roughness average height Rc at interface (μm) | 23 | 2 |
| fiber-reinforced resin molding | reinforcing fibers being across interface between and in contact with two resin regions | existence | absence |
| | roughness average length RSm at interface (μm) | 46 | 181 |
| | roughness average height Rc at interface (μm) | 24 | 2 |
| integrated product | welding temperature (° C.) | 300 | |
| | hold hours (min) | 2 | |
| | tensile shear joining strength (MPa) | B<br>27.1 | C<br>21.2 |
| | coefficient of variation in tensile shear joining strength (CV) (%) | 4.7 | 4.8 |

Experimental Example 4: Influence of Surface Free Energy of Reinforcing Fiber Except for using the epoxy resin composition prepared in Example 1 and using the carbon fiber species specified in Table 5 to form reinforcing fiber sheets, the same procedure as in Experimental example 2 was carried out to produce a fiber-reinforced resin molding and an integrated product.

Table 5 shows results of evaluation for physical properties etc. of the fiber-reinforced resin molding and the integrated product.

TABLE 5

| epoxy resin composition | | Example 1 | | | | |
|---|---|---|---|---|---|---|
| thermoplastic resin | | | | PPS | | |
| reinforcing fiber | | carbon fiber 2 | carbon fiber 3 | carbon fiber 4 | carbon fiber 5 | carbon fiber 6 |
| | surface free energy ($mJ/m^2$) | 9 | 32 | 18 | 32 | 33 |
| fiber-reinforced resin molding | 1) compression strength (non-treatment conditions) (GPa) | 1.61 | 1.63 | 1.61 | 1.62 | 1.62 |
| | 120° C. | 9.1 | | 9.1 | 9.1 | 9.1 |
| | 2) compression strength after exposure to 300° C. (GPa) | A | A | A | A | A |
| | | 1.57 | 1.59 | 1.57 | 1.58 | 1.58 |
| | 3) compression strength at 120° C. after water | A | A | A | A | A |
| | absorption (GPa) | 1.21 | 1.23 | 1.21 | 1.22 | 1.22 |
| integrated product | tensile shear joining strength (MPa) | C | A | B | A | A |
| | coefficient of variation in tensile shear joining strength | 23.5 | 31.2 | 25.8 | 29.8 | 30.5 |
| | (CV) (%) | 9.3 | 4.5 | 7.2 | 5.1 | 5.4 |

EXPLANATION OF NUMERALS

1: reinforcing fiber

2: region containing thermoplastic resin

3: thermosetting resin region containing epoxy resin composition (or its cured product)

4: observed Image

5: interface

6: reference line

7: perpendicular guideline

8: cross-sectional profile curve

The invention claimed is:

1. An epoxy resin composition comprising an epoxy resin (A) that has a polycyclic aromatic hydrocarbon skeleton or a biphenyl skeleton and has an epoxy equivalent weight of 220 g/eq or more and 290 g/eq or less and a polyamine compound having an average active hydrogen equivalent weight of 55 g/eq or more and 100 g/eq or less wherein the average epoxy equivalent weight over all epoxy resins present is 160 g/eq or more and 255 g/eq or less, wherein the epoxy resin composition satisfying at least one of the following features (i) or (ii):

feature (i): the epoxy resin (A) has a weight average molecular weight of 500 g/mol or more and 1,000 g/mol or less:

feature (ii): the epoxy resin (A) has a structure represented by formula (1) or (2):

(1)

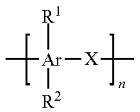

wherein in the formula (1),

X is selected from an ether bond, a sulfide bond, and a biphenyl bond;

$R_1$ and $R_2$ are each independently selected from a hydrogen atom, an aliphatic hydrocarbon group with a carbon number of 1 to 4, an alicyclic hydrocarbon group with a carbon number of 4 or less, a halogen atom, a glycidyl ether group, and a glycidyl amine group;

Ar is selected from naphthalene, anthracene, pyrene, and tetracene; and n is an integer of 2 or more;

(2)

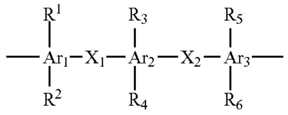

wherein in the formula (2), $X_1$ and $X_2$ are each independently selected from an ether bond, a sulfide bond, and a biphenyl bond;

$R_1$ to $R_6$ are each independently selected from a hydrogen atom, an aliphatic hydrocarbon group with a carbon number of 1 to 4, an alicyclic hydrocarbon group with a carbon number of 4 or less, a halogen atom, a glycidyl ether group, and a glycidyl amine group;

$Ar_1$ to $Ar_3$ are each independently selected from phenylene, naphthylene, anthracene, pyrene, and tetracene; and at least one or more of $Ar_1$ to $Ar_3$ are selected from the above group excluding phenylene.

2. The epoxy resin composition as set forth in claim 1, wherein the average epoxy equivalent weight over all epoxy resins present is 180 g/eq or more and 255 g/eq or less.

3. The epoxy resin composition as set forth in claim 1, wherein the epoxy resin (A) accounts for 35 parts by mass or more and 100 parts by mass or less relative to all epoxy resins present, which account for 100 parts by mass.

4. The epoxy resin composition as set forth in claim 1, further comprising a thermoplastic resin soluble in epoxy resins in an amount of 3 mass % or more and 25 mass % or less.

5. The epoxy resin composition as set forth in claim 1, wherein a cured product resulting therefrom when heated at 180° C. for 120 minutes shows a rate of mass loss on heating of 1.0% or less when maintained at 300° C. for 2 minutes and having a glass transition temperature of 180° C. or more and 350° C. or less.

6. A prepreg produced by impregnating a reinforcing fiber with the epoxy resin composition as set forth in claim 1.

7. A prepreg produced by impregnating a reinforcing fiber with an epoxy resin composition comprising:

an epoxy resin (A) having a polycyclic aromatic hydrocarbon skeleton or a biphenyl skeleton and having an epoxy equivalent weight of 220 g/eq or more and 290 g/eq or less; and a polyamine compound having an average active hydrogen equivalent weight of 55 g/eq or more and 100 g/eq or less, wherein the average epoxy equivalent weight over all epoxy resins present is 160 g/eg or more and 255 g/eq or less, wherein the prepreg satisfies at least one of the following features (iii) or (iv):

feature (iii): the reinforcing fiber has a surface free energy of 10 $mJ/m^2$ or more and 50 $mJ/m^2$ or less as measured by the Wilhelmy method;

feature (iv): the prepreg has a thermoplastic resin region at a surface, wherein a thermosetting resin region containing the epoxy resin composition and the thermoplastic resin region form separate layers that are adjacent to each other.

8. The prepreg as set forth in claim 6 having a thermoplastic resin region at the surface.

9. The prepreg as set forth in claim 8, wherein the thermosetting resin region containing an epoxy resin composition and the thermoplastic resin region form separate layers that are adjacent to each other.

10. The prepreg as set forth in claim 9, wherein the interface between the thermosetting resin region and the thermoplastic resin region has a roughness average height Rc of 3.5 μm or more.

11. A fiber-reinforced resin molding containing, as matrix resin, a cured product of the epoxy resin composition as set forth in claim 1.

12. A fiber-reinforced resin molding containing a layer produced by curing the prepreg as set forth in claim 8, wherein the thermoplastic resin region is exposed at the surface.

13. An integrated product containing a fiber-reinforced resin molding containing a layer produced by curing a prepreg having a thermoplastic resin region at a surface produced by impregnating a reinforcing fiber with an epoxy resin composition comprising:

an epoxy resin (A) having a polycyclic aromatic hydrocarbon skeleton or a biphenyl skeleton and having an epoxy equivalent weight of 220 g/eq or more and 290 g/eq or less; and a polyamine compound having an average active hydrogen equivalent weight of 55 g/eq or more and 100 g/eq or less, wherein the average epoxy equivalent weight over all epoxy resins present is 160 g/eq or more and 255 g/eq or less, wherein the thermoplastic resin region is exposed at the surface, and wherein another member is welded to the thermoplastic resin region.

14. A fiber-reinforced resin molding containing, as matrix resin, a layer produced by curing the prepreg as set forth in claim 6.

* * * * *